May 15, 1951 W. H. PHELPS 2,552,583
MOWING MACHINE

Filed June 8, 1948 2 Sheets-Sheet 1

Inventor:
William H. Phelps
By:
Chritton, Schroeder, Merriam & Hofgren
Attorneys

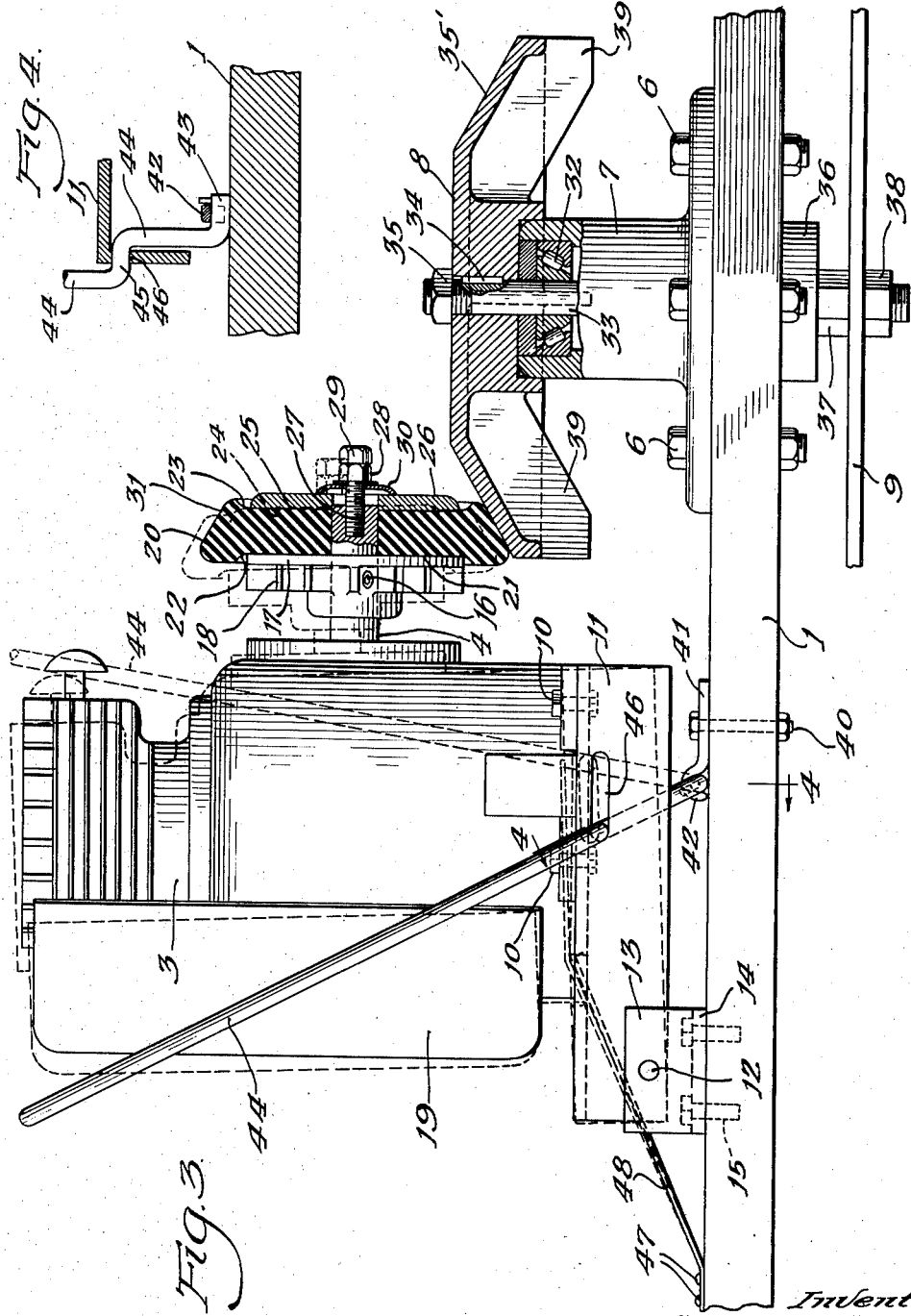

Patented May 15, 1951

2,552,583

UNITED STATES PATENT OFFICE 2,552,583

MOWING MACHINE

William Howard Phelps, Ralston, Nebr.

Application June 8, 1948, Serial No. 31,762

4 Claims. (Cl. 56—25.4)

This invention relates to a mowing machine for cutting grass, weeds and the like, and more particularly to such device in which the rotary cutting blade is driven from an internal combustion engine by a friction drive having a friction driving wheel and a friction driven wheel and in which the friction driving wheel is itself driven by friction from the drive shaft of the engine.

In a mower or other machine having a tool driven through a friction driven wheel and a friction drive wheel from a single cylinder internal combustion engine the explosion point in the cycle will always occur at substantially the same place with relation to the position of the piston, and if the friction drive wheel is rigidly fixed to the crank shaft there will always be a slight slipping of the friction drive wheel on the contacting surface of the friction driven wheel at the time of explosion in the engine cylinder. Even though this amount of slipping will be slight at each explosion, it will in time add up to a considerable amount due to the large number of explosions occurring during the operation of the engine. Such slipping occurring at the same place in the circumference of the friction drive wheel, will in time cause a flat spot to wear in said circumference, which flat spot will increase in size and in time break the friction drive wheel apart at this point. This difficulty I have overcome in the present invention by providing a slipping friction drive for the friction drive wheel itself.

Among the objects of my invention are: to provide a novel and improved mowing machine; to provide a novel and improved friction drive for mowers; to provide a friction drive having a friction driven wheel and a friction drive wheel in which there is provided a slipping friction drive for the friction drive wheel itself; to provide a mower having novel cooling means; to provide a mower having means for preventing accumulation of clippings on the machine and keep them blown off and scattered during the operation of the mower; to provide an internal combustion engine hingedly mounted on a wheeled platform and novel means for moving the friction drive wheel into and out of contact with the friction driven wheel to start and stop operation of the cutting blade; to provide means for normally constantly urging the friction drive wheel toward the active surface of the friction driven wheel; to provide novel means for selectively breaking said contact; and such further objects, advantages and capabilities, inherently possessed by my invention, as will later more fully appear.

The invention is illustrated in a preferred embodiment in the accompanying drawings, in which—

Fig. 3 is an enlarged fragmentary side elevation, partly in section, showing an internal combustion engine hingedly mounted on a mower platform, and a friction drive for the cutter blade.

Fig. 4 is a fragmentary transverse section on the line 4—4 of Fig. 3.

Figure 1:
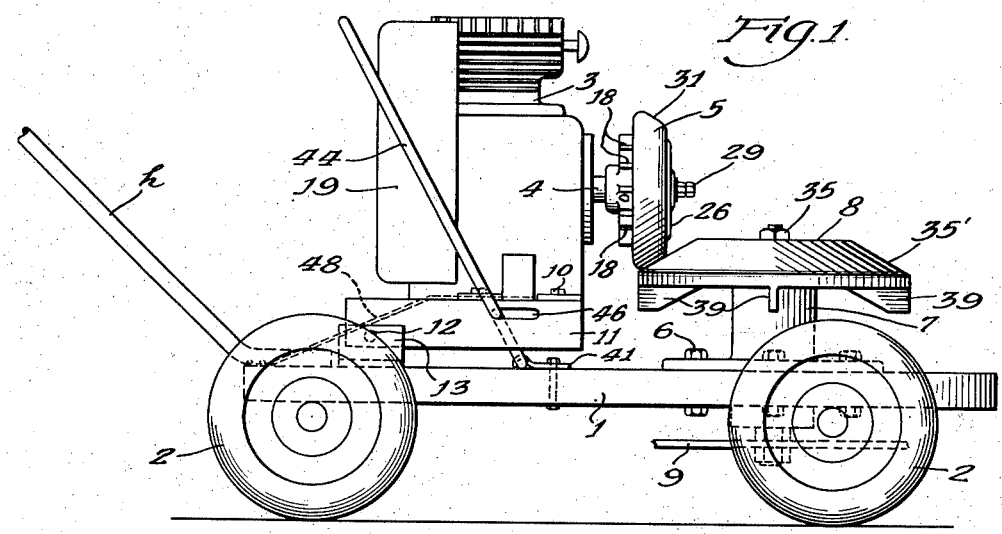
Fig. 1 is a side elevation of a mower embodying my invention.

In the embodiment illustrated, my improved mower comprises in general a platform 1 mounted on wheels 2 to enable the mower to be pushed, by the handles h, along over the ground to be mowed, there being swingably mounted above the top of the platform a vertically extending single cylinder, two-cycle internal combustion engine 3, having an outwardly extending crank shaft 4 on which is mounted a friction drive wheel 5. Fixed to the upper surface of the platform by bolts or the like 6 is a pedestal 7 upon which is rotatably mounted a wheel 8, frictionally driven by the friction drive wheel 5, said friction driven wheel 8 having fixed to rotate therewith a cutter blade 9 for cutting grass, weeds and the like as the mower is moved along over the ground.

The internal combustion engine 3 is fixed by bolts or the like 10 to a base member 11, which on each side toward its rear edge is provided with a trunnion or the like 12, pivotally mounted in an upstanding plate 13 having in its bottom edge a horizontal flange 14 fixed by bolts or the like 15 to the platform 1. This enables the internal combustion engine to be tilted in a vertical plane for reasons explained more fully hereinafter.

Fixed to the crank shaft 4 by a bolt 16, and any additional means desired to securely lock the same thereon, is a back plate 17 having formed on its rear surface a plurality of rearwardly extending vanes or blades 18 which, when the back plate is in rotation with the crank shaft, serve to direct cooling air currents against the front side of the internal combustion engine and into the return baffle 19 from which they are deflected against the rear side of the internal combustion engine for cooling the same. Some of said air currents will also strike the exposed part of the crank shaft to further facilitate the cooling operation. These vanes or ribs 18 also serve as strengthening means for the back plate 17.

Rotatably mounted upon the crank shaft 4, just in front of the back plate 17 is a friction drive wheel 20 preferably formed of rubber and adapted to be frictionally driven by the back plate which back plate, as stated above, is secured and locked to the crank shaft extension for positive rotation therewith. Very satisfactory results have been secured by making said friction drive wheel 20 of 95 durometer hardness rubber with a full hard rubber hub or center which is rotatable on the crank shaft extension when any slipping occurs between the back plate and the friction drive wheel. The back plate 17 has a flat face positioned against the flat face 21 of the depression 22 formed in the rear face of the friction drive wheel. The front face of the friction drive wheel 20 is also preferably formed with a depressed portion 23 having a flat face 24 against which presses a complemental flat face 25 of a pressure plate 26 having a central aperture seated over the crank shaft extension 4. Threaded into a threaded opening in the end of the crank shaft extension is a stud 27 upon which are threaded a main nut 28 and a lock nut 29. Positioned between the main nut 28 and the outer face of the pressure plate 26 is a cup-shaped spring steel washer 30, so that when pressure is applied against this bowed spring washer by nut 28 this pressure will be transmitted to the pressure plate 26 and in turn to the friction drive wheel 20, resulting in the latter pressing with a desired degree of pressure against the front face of the back plate 17. When nut 28 has been adjusted on stud 27 to give a desired pressure between the back plate and the friction drive wheel this adjustment will be maintained by tightening lock nut 29.

The outer circumference of the friction drive wheel is preferably bevelled as shown at 31. Rotatably mounted within the pedestal 7 by any suitable anti-friction means, such as the rollers 32 and their complemental mounting, is a vertical shaft 33 having fixed at its upper end by a key 34 and a nut 35 the friction driven wheel 8, which around its marginal edge portions is formed with a bevel portion 35′ so that when the friction drive wheel is in driving engagement with the friction driven wheel the inclined driving surfaces 31 and 35′ will be formed of complemental angles to facilitate satisfactory driving engagement therebetween.

Shaft 33 extends any suitable distance below the bottom surface of platform 1. Cutter blade 9 is fixed to this shaft between the spacer element 37 and a nut 38 which nut fixes the cutter blade to the shaft for rotation therewith at any suitable distance above the ground. Fixed to the bottom marginal portions of the friction driven wheel 8, or integrally formed therewith as desired, are a plurality of vanes and strengthening members 39 which during rotation of the friction driven wheel 8 will function as cooling means and also to blow off from the platform and adjacent portions of the machine any clippings or cuttings, to prevent accumulation of the same on the machine.

Fixed by bolt 40 or other suitable fastening means, to the platform 1 is a plate 41 having formed in its rear end a hook or loop 42 under which is rotatably mounted the laterally bent end 43 of a clutch lever 44. The lever at the inner end of the bent end 43 extends vertically upwardly at 44 and then to the left as viewed in Fig. 4 to form the horizontal cam portion 45, and thence vertically upwardly to be available for grasping by the operator for swinging movement forwardly and rearwardly with relation to the platform. Formed in one of the side walls of the base member 11 is a longitudinally extending horizontal slot 46, within which moves the horizontal cam portion 45 of the clutch lever 44. Lever 44 is shown in solid lines in Fig. 3 as being at the rear end of slot 46, in which position the engine 3 is lowered to bring the adjacent circumferences of friction drive wheel 20 and friction driven wheel 8 into driving contact with each other. In other words when the lever 44 is in its rear position the parts are so arranged that the friction drive wheel 20 will exert full driving force against friction driven wheel 8 to operate the cutter blade 7 for cutting grass, weeds and the like. This is due to the fact that in this position of parts the engine has swung forwardly about the pivotal axis 12 into the full line position shown in Fig. 3. When however it is desired to lessen the friction between the friction drive wheel 20 and the friction driven wheel 8, swinging of lever 44 to its extreme forward position as shown in dotted lines in Fig. 3 will swing the engine about its pivotal axis 12 to the rear into the position shown in dotted lines in Fig. 3, which will raise the friction drive wheel away from the friction driven wheel, as also shown in dotted lines in Fig. 3, to discontinue the application of driving power to the cutter blade.

Figure 2:
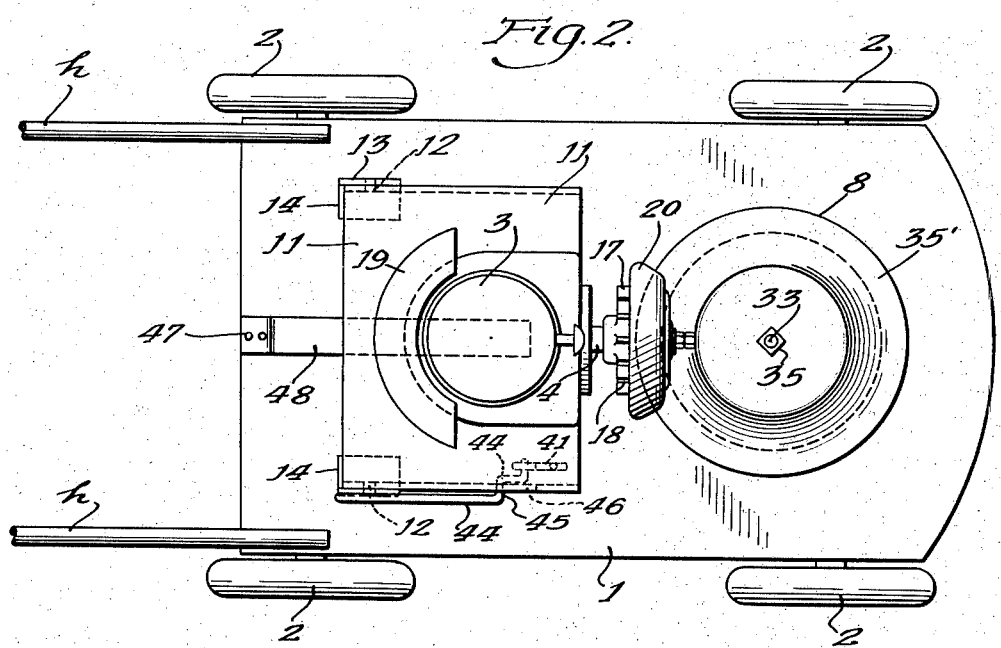
Fig. 2 is a top plan view of Fig. 1.

In this connection it will be understood that the horizontal portion 45 of lever 44 constitutes a cam which during movement of lever 44 will ride against the top wall or edge of slot 46 in the arc of a circle having the center of the bent portion 43 as a fulcrum, thus raising the base member 11 during forward movement of the lever, and lowering the same during the rearward movement of the lever. In order to provide a positive drive between the friction drive wheel and the friction driven wheel without merely depending upon the weight of the engine and associated parts, there is fixed to the platform to the rear of the base member 11 by rivets, bolts or the like 47 a leaf spring 48 which at its forward end slidably presses downwardly against the upper surface of the base member 11, this spring being so formed and mounted as to always press downwardly at its forward end against the base member 11 to tend to urge the friction drive wheel against the friction driven wheel unless such friction driving contact is lessened or prevented by forward movement of the lever 44. If preferred any other suitable lost motion connection may be provided between the front end of leaf spring 48 and the base member 11 so as to prevent any binding of parts during the swinging movement of the base member 11. While in Fig. 2 this leaf spring 48 is shown as applied through a slot to the middle portion of the base member 11, it will be understood that any suitable location of the leaf spring 48 may be used as desired.

From the above it will be seen that I have provided a friction drive for driving a rotary cutter blade or other suitable tool from an internal combustion engine in such manner as to prevent the forming of a flat spot on the friction drive wheel. This is prevented by a slight slipping movement between the friction drive wheel 20 and the back plate 17 at the explosion moment. Even though this slip at the time of explosion is very slight it will be understood that due to the large number of explosions occurring in a gas engine during its normal operation, this slippage will eventually amount to a considerable amount. For example the back plate is held against the adjacent flat surface of the friction drive wheel with sufficient pressure that the slippage between these parts will be as little as from ½ to 1/1000 of an inch per explosion. The operating surfaces are machined, including the rear flat surface of the friction drive wheel so that, even though the slippage for each explosion is small, this flat surface of the friction drive wheel works its way continuously around with relation to the back plate 17 without developing a flat spot on the friction drive wheel. Applicant has tested the same by marking with a spot of paint on the back plate 17 and an opposite spot of paint on the friction drive wheel, which showed that after five minutes operation with the engine running at 3000 R. P. M. the two paint spots were as much as two inches apart. It will be understood however that such distance can be regulated to be more or less, depending upon the amount of pressure exerted by the nut 28 and the cup-shaped spring steel washer 30 against the pressure plate 26 and between the adjacent surface of the friction drive wheel and the back plate.

Further tests developed that by having the friction drive wheel rigidly fixed to the crank shaft extension to at all times positively rotate therewith, this created the flat spot referred to earlier herein as a result of which it was possible to only get a life expectancy of the machine of about 1½ to 2 mowing seasons. By the present invention however this machine may be successfully operated through a long number of mowing seasons. Also the use of the cooling vanes on the back face of the back plate 17 so effectively cools the engine and crank shaft that it is hardly ever possible to notice a temperature rise above atmospheric temperature in the large friction driven wheel.

Also the provision of the leaf spring 48 is an important feature of this invention, as this spring exerts a force downward at all times to retain proper pressure between the friction drive wheel and the friction driven wheel so that, regardless of the angle a mower may be when in operation, either on a side hill or going up hill, the shifting of the center of gravity of the engine itself does not affect the efficiency of the friction drive. This is due to the spring being the primary pressure means rather than depending upon the weight of the engine itself. The cam clutch lever, as will be understood, serves as means for connecting and disconnecting the rotary cutter blade to and from the power. This enables the engine to be started with the blade out of gear or disengaged.

Having described my invention, I claim:

1. In a friction drive for an internal combustion engine having an extending crank shaft, a back plate fixed to said crank shaft, a friction wheel rotatably mounted on said crank shaft and in slipping contact with said back plate, a pressure plate in front of said friction wheel, a concave spring in contact with the front of said pressure plate, means for varying the tension of said spring to vary the friction between the back plate and the friction wheel, a second friction wheel frictionally driven by contact with the first mentioned friction wheel, and a driven shaft fixed to the second friction wheel.

2. In a friction drive, an internal combustion engine, a drive shaft driven by said engine, a first friction wheel rotatably mounted on the drive shaft, a back plate fixed to said shaft and having frictional driving contact with the rear face of the first friction wheel, a pressure plate on said shaft on the opposite side of said first friction wheel, a cup-shaped spring washer between said pressure plate and the adjacent face of the first friction wheel, means for applying pressure to said washer and said pressure plate so as to regulate the frictional driving pressure between the back plate and the first friction wheel, a second friction wheel frictionally driven from the first friction wheel, a tool mounted to rotate with said second friction wheel, and means to bring said two friction wheels into and out of contact with each other.

3. In a mower, a wheeled platform, an internal combustion engine on said platform and having an extended crank shaft, a back plate rigidly fixed to said crank shaft and having a friction face in a plane at right angles to the longitudinal axis of the crank shaft, a first friction wheel slippably mounted on said crank shaft and having a friction face in frictional engagement with the friction face of said back plate, adjustable pressure means for selectively increasing and decreasing the frictional driving contact between said two faces, a second friction wheel frictionally driven by said first friction wheel, a shaft fixed to said second friction wheel, and a rotary cutter blade fixed to said last mentioned shaft, whereby any wear on the first friction wheel caused by explosions in the engine will be gradually progressively distributed around the circumference of the first friction wheel to give longer life thereto.

4. In a friction drive for an internal combustion engine having an extended crank shaft, a back plate rigidly fixed to said crank shaft and having a friction face in a plane at right angles to the longitudinal axis of the crank shaft, a first friction wheel slippably mounted on said crank shaft and having a friction face complemental to that of said back plate and in frictional engagement therewith, adjustable pressure means for increasing and decreasing the frictional driving contact between said two faces, a second friction wheel frictionally driven by contact with said first friction wheel, a shaft fixed to said second friction wheel, and a tool fixed to said last mentioned shaft, so that any wear on the first friction wheel from the second friction wheel caused by explosions in the engine will be gradually progressively distributed around the circumference of the first friction wheel to give longer life thereto.

WILLIAM HOWARD PHELPS.

REFERENCES CITED

The following references are of record in the file of this patent:

UNITED STATES PATENTS

| Number | Name | Date |
|---|---|---|
| 1,508,827 | Valiquet | Sept. 16, 1924 |
| 1,819,791 | Reed | Aug. 18, 1931 |
| 1,866,380 | Wagner | July 5, 1932 |
| 2,166,450 | Smalley | July 18, 1939 |
| 2,232,671 | Loder | Feb. 18, 1941 |
| 2,278,922 | Goodall | Apr. 7, 1942 |
| 2,445,965 | Packwood | July 27, 1948 |